May 19, 1970 REIJIRO FUKUTOMI ET AL 3,513,262

ALL-BUSY TRUNK SIGNALLING IN COMMON-CONTROL TELEPHONE SWITCHBOARDS

Filed April 11, 1967 5 Sheets-Sheet 1

United States Patent Office 3,513,262

Patented May 19, 1970

3,513,262

ALL-BUSY TRUNK SIGNALLING IN COMMON-CONTROL TELEPHONE SWITCHBOARDS

Reijiro Fukutomi, Kanazawa-shi, Yoshihito Iwai, Toshio Ando, Takeo Kontani, Hiroshi Nakamura, and Iwao Kameyama, Tokyo-to, Sadayuki Hiragi, Shigeaki Kurahashi, Satosi Takemori, Yokohama-shi, and Tomoo Okada, and Akira Izeki, Kawasaki-shi, Japan, assignors to Nippon Telegraph & Telephone Public Corporation, Nippon Electric Company, Limited, Oki Electric Industry Co., Ltd., Hitachi Ltd., all of Tokyo-to, Japan and Fujitsu Limited, Kanagawa-ken, Japan Filed Apr. 11, 1967, Ser. No. 629,940
Claims priority, application Japan, Apr. 14, 1966, 41/23,686
Int. Cl. H04q 3/56
U.S. Cl. 179—18 7 Claims

ABSTRACT OF THE DISCLOSURE

An all-busy signal arrangement is provided for a telephone central office embodying an incoming register link and/or an outgoing sender link, each link including a plurality of primary crossbar switches and a plurality of secondary crossbar switches interconnected by a plurality of other links. Each primary switch in the incoming register link or in the outgoing sender link is provided with a plurality of off-normal contacts which are closed, when all other links of a particular primary switch are busy, to actuate the signal arrangement to send all-busy signals through the incoming or outgoing trunks connected therewith to the preceding telephone central office to cause thereat the selection of another idle route or to a marker of the particular office to cause thereat the selection of another idle route.

This invention relates to a telephone central office of the common control type, such as a crossbar office and, more particularly to an all-busy signal arrangement for such office embodying an incoming register link and/or an outgoing sender link, each including a plurality of primary and secondary crossbar switches interconnected by a plurality of other links. Each primary switch in the incoming register link or outgoing sender link is provided with off-normal contacts which are closed, when all other links connected to a particular primary switch are busy, to actuate the signal arrangement to send all-busy signals through the incoming or outgoing trunks connected therewith to the preceding telephone central office to cause thereat the selection of another idle route or to the marker of the particular office to cause thereat the selection of anohter idle route.

In a common-control telephone switchboard, it is a general practice to divide the incoming registers and the incoming trunks into groups and to couple the individual groups of the registers with the individual groups of the incoming trunks through an incoming register link. Similarly, the outgoing senders and the outgoing trunks are divided into respective groups, which are also coupled together through an outgoing sender link. It is also a common practice to allot a relatively large number of registers, senders and trunks to each of such groups. Inasmuch as the link must, in the case of large groups, accommodate a relatively large number of the incoming or outgoing trunks on the input side and also a relatively large number of the incoming registers or outgoing senders on the output side, it is a usual practice to use a link of double or multiple connections. Division of such equipments into larger groups has been found to raise the efficiency of the registers, senders, and incoming and outgoing trunks, and thus reduces the number of them, as compared with a division of such equipments into a multiplicity of smaller groups.

It is to be noted here that in case dial pulses are transmitted from another telephone central office, which will be herein referred to as a preceding office and which may be provided with common-control and/or step-by-step equipments, to the incoming trunk seized by the originating office of the call and in case the seized incoming trunk has not yet been notified of seizure of an incoming register, the busy tone is sent back to the calling party to avoid any misconnection. The call becomes a loss whose probability is not negligible in a conventional common-control telephone switchboard. It is also to be noted that in case all of the outgoing links of that primary switch of the outgoing sender link which is connected with the outgoing trunk selected by the marker are busy, the marker must wait until one of such outgoing links becomes idle and, after having waited longer than a predetermined time interval, causes a disconnection of the outgoing trunk and a consequent sending back to the calling party of the busy tone. This not only lengthens the holding time of the marker, but also provides another cause of loss of calls. Thus, a conventional common-control telephone central office still has disadvantages which, if removed, would tend to improve the telephone service.

An object of the present invention is therfore to provide a common-control telephone central office having excellent performance.

Another object of this invention is to provide a telephone central office which includes a reduced probability of loss of calls and thus improves the telephone service.

A further object of this invention is to provide a telephone central office which ensures reduced holding time of the marker and thus improves the office service.

According to this invention, there is provided a common-control telephone central system having a plurality of groups of trunks, a plurality of groups of senders or registers, a plurality of primary crossbar switches each connected to one trunk group, a plurality of secondary crossbar switches each connected to one sender or register group, and a plurality of groups of links, each latter group connecting one primary switch to each of the secondary switches, wherein the improvement comprises a plurality of first circuit means each associated with the link group included in one primary switch, one of the first circuit means simultaneously applying ground busy signals to the respective trunks of the trunk group connected to a first predetermined primary switch when all of the links in the link group associated with the latter switch are busy in response to calls, and second circuit means activated by the ground busy signals on the latter trunk group to block the transmission of a further call via the latter trunk group and the primary switch connected thereto and thereafter to route such further call on a trunk included in a remaining trunk group connected to another primary switch having an idle link in the link group connected therewith.

This invention is equally well applicable to the incoming register link and the associated circuitry and to the outgoing sender link and the related circuitry. It is similarly well operative even though the preceding offices are not provided with common-control equipments but with step-by-step equipments. In the case of an incoming trunk, the all-busy signals are sent to the preceding office to actuate the marker (in common-control equipment) or the selector (in step-by-step equipment) so that in order to route a call, the latter is detoured around the blocked group of signal repeaters or outgoing trunks of the preceding office and the blocked group of incoming trunks of the office, and is finally sent through one channel in another group of signal repeaters or outgoing trunks coupled with that one group of incoming trunks which is coupled with a primary crossbar switch having at least one idle link in the link group associated therewith. In the latter case of an outgoing trunk, the all-busy signals are sent to the marker of the office originating the latter signals so that in order to let the call be transmitted, the latter is detoured around the blocked group of ongoing trunks, and is finally sent through one channel in that one of the outgoing trunks which is connected with a primary crossbar switch having at least one idle link.

As will later be explained in conjunction with an example of the telephone central office, this invention reduces the probability of loss of calls to a half of the probability of loss of calls with prior art equipments. When applied to the outgoing sender link, the invention diminishes the holding time of the marker. This invention, as a consequence, substantially raises the efficiency of the telephone office service.

The instant invention is hereinafter described with reference to the accompanying drawings, in which.

Figure 5A:
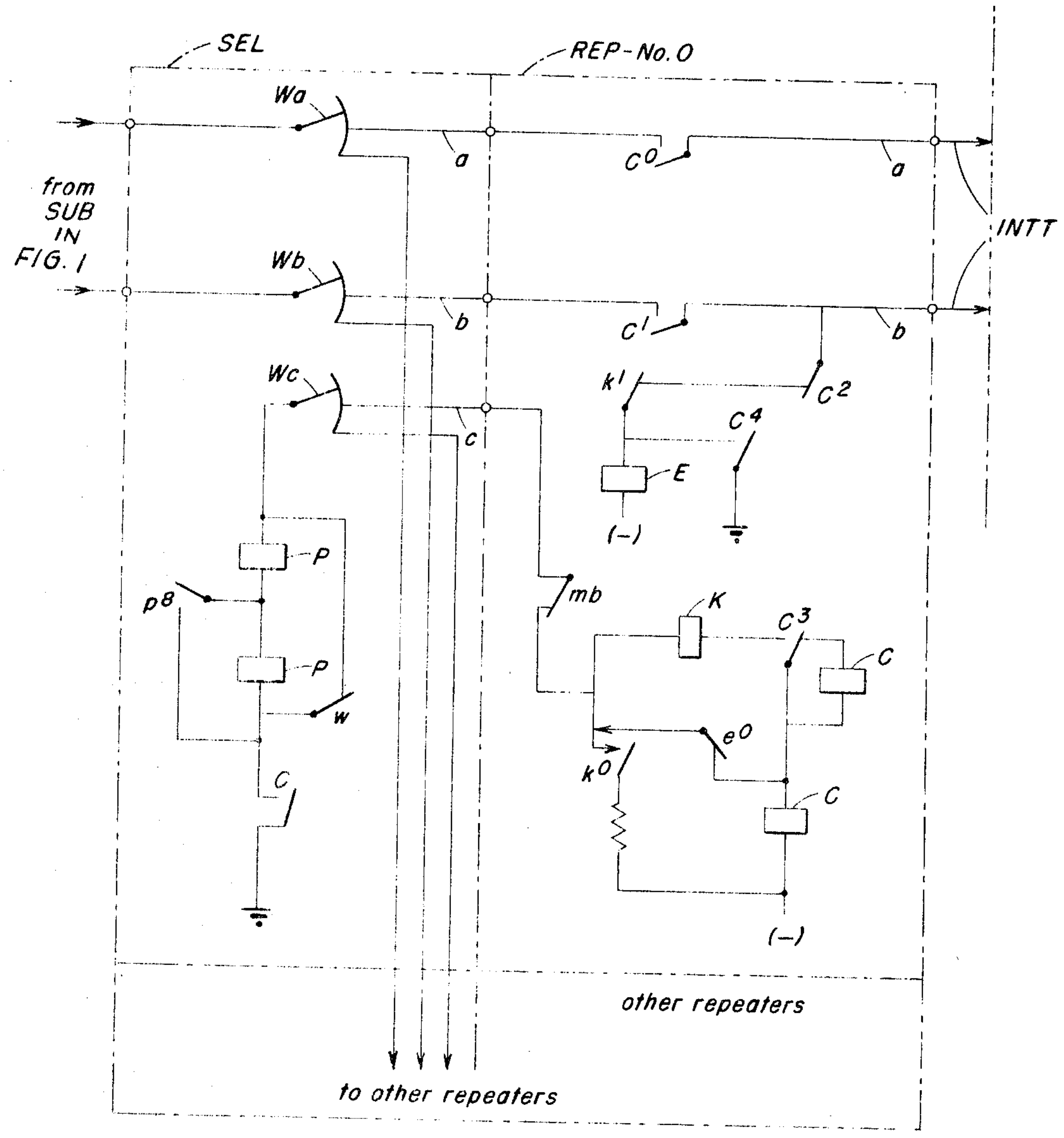
Figure 5B:
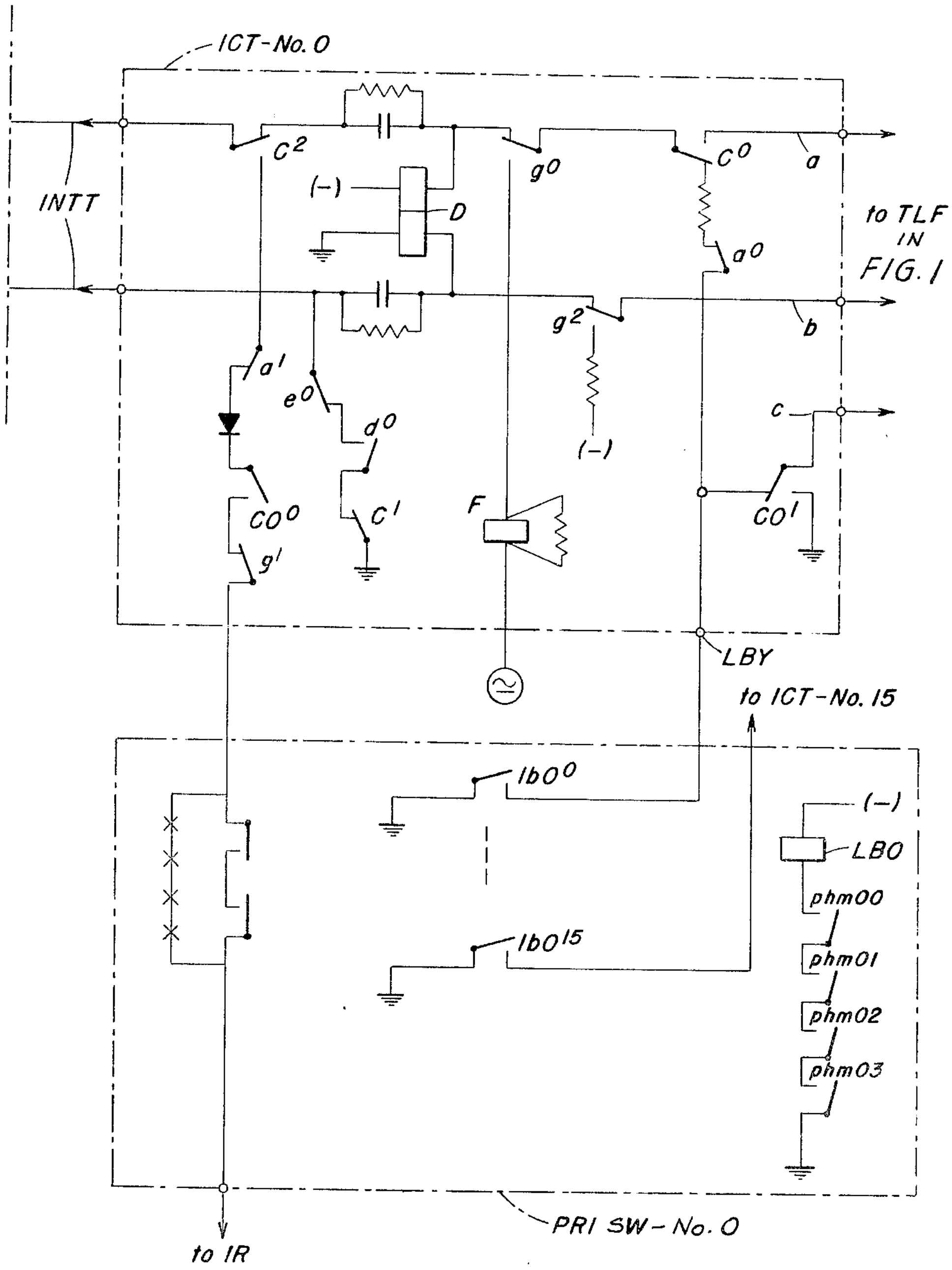
Figure 6:
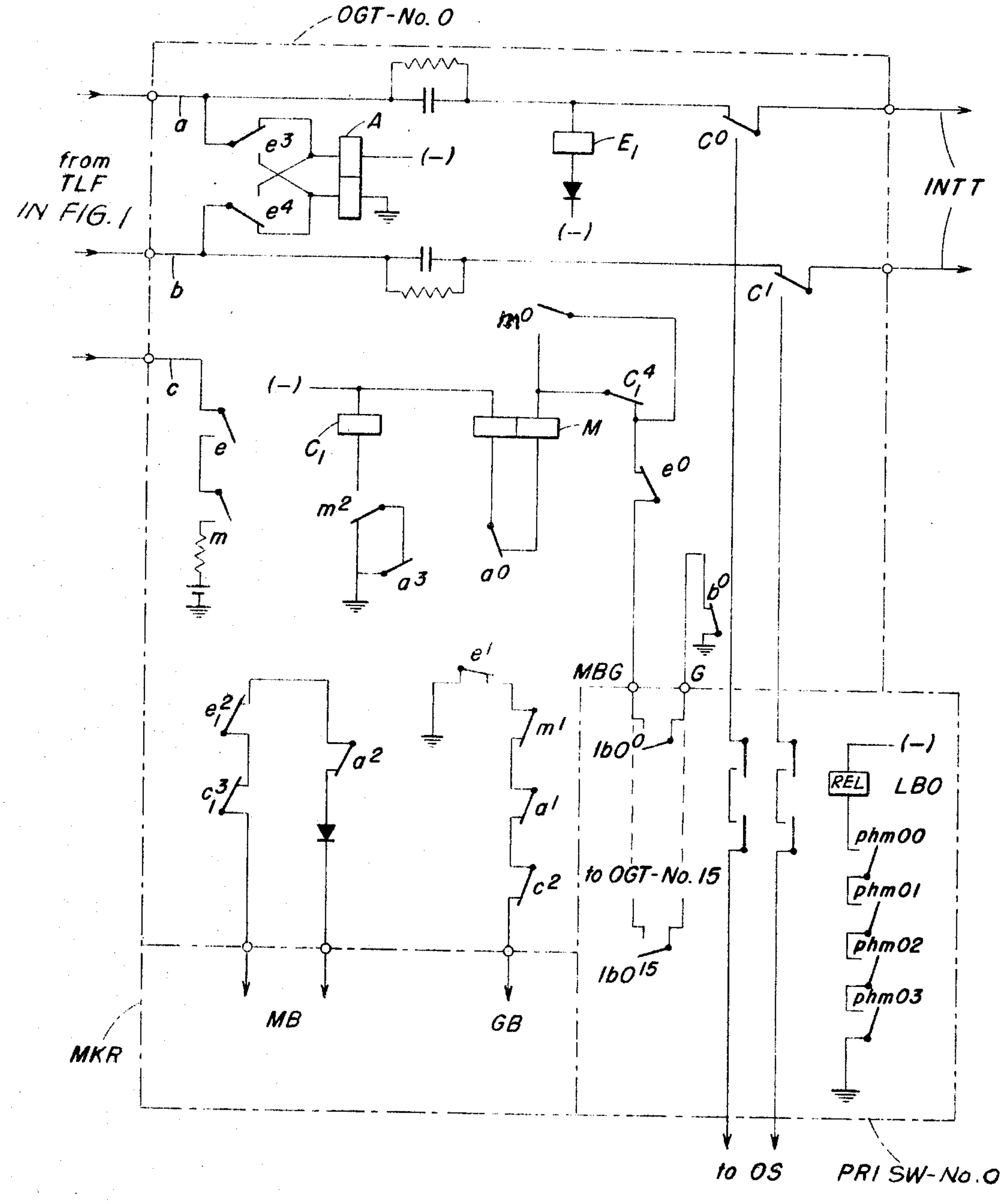

FIGS. 5A and 5B schematically illustrate, together with a portion of a preceding step-by-step office, the circuit of a portion of an incoming register link in which this invention is embodied; and FIG. 6 schematically shows, together with a portion of a marker, the circuit of a portion of an out going sender link to which this invention is applied.

Figure 1:
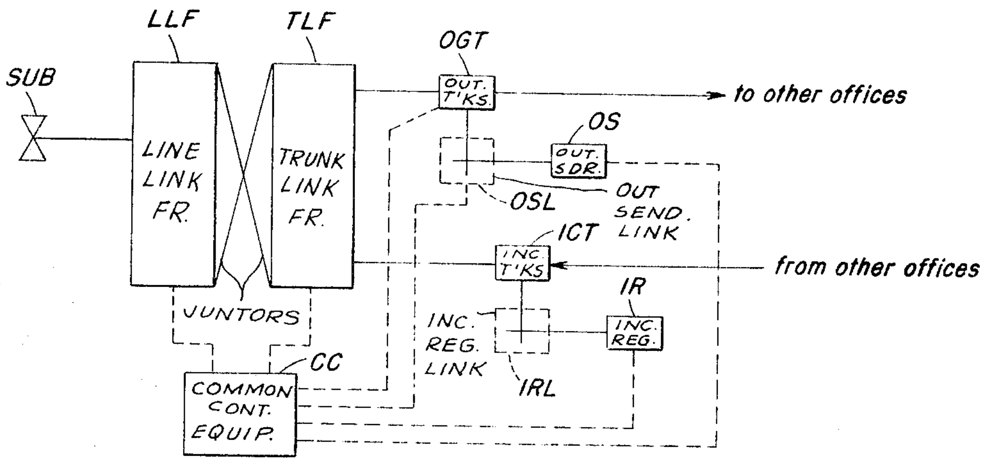
FIG. 1 is a block diagram illustrating, together with subscriber's stations, a general common-control telephone central office.

Referring to FIG. 1, a common-control telephone central office generally comprises a line link frame LLF (or an incoming link frame) with which a plurality of symbolically shown subscriber's stations SUB (or other telephone central offices, not shown) are coupled, a trunk link frame TLF (or office link frame) coupled with the line link frame LLF by junctors, and a common control equipment CC for completing the desired connection from one of the subscriber's stations SUB to a subscriber's station accommodated by another telephone central office and from a subscriber's station belonging to another telephone central office to one of the subscriber's stations SUB of the shown office (or from another telephone central office to still another telephone central office). The telephone central office of FIG. 1 further comprises a large number of incoming trunks ICT interposed between the trunk link frame TLF and the preceding telephone central offices which are provided with common-control and/or step-by-step equipments, a smaller number of incoming registers IR, and an incoming register link IRL for operatively connecting, in the manner later to be outlined, one of the incoming registers IR with that of the incoming trunks ICT to which a call has been supplied from the associated preceding office. The telephone central office of FIG. 1 still further comprises a large number of outgoing trunks OGT interposed between the trunk link frame TLF and the succeeding telephone central offices, a smaller number of outgoing senders OS, and an outgoing sender link OSL for operatively connecting, in the manner also to be described, one of the outgoing senders OS with that one of the outgoing trunks OGT through which the call should be routed to the suceeeding office.

Figure 2:
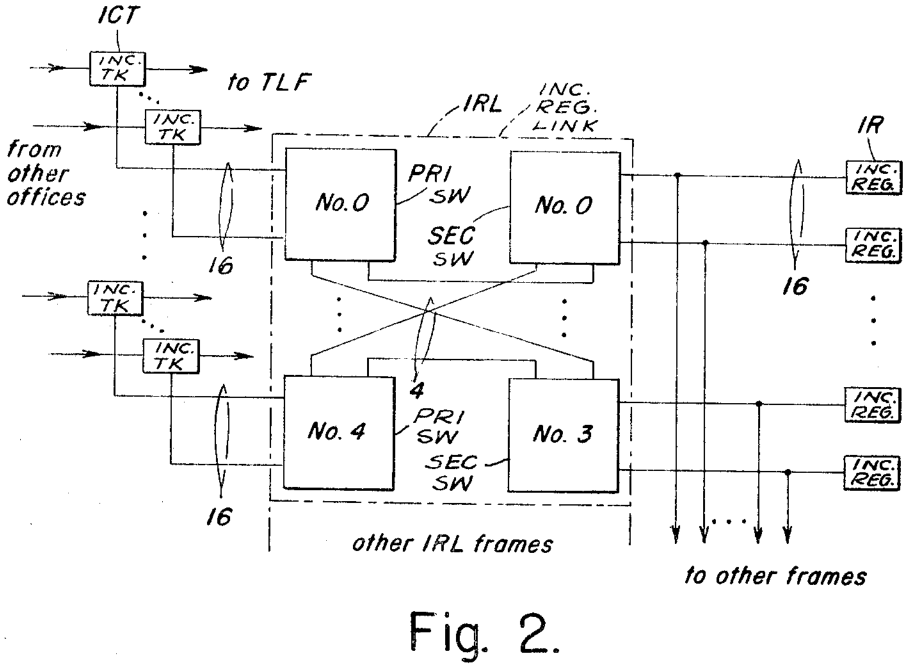
FIG. 2 is a block diagram showing an incoming register ling of a telephone central office of FIG. 1, together with the incoming trunks and the incoming registers.

Referring to FIG. 2, incoming register link IRL is of the double link connector type and comprises a relatively large number of primary crossbar switches PRI SWS connected with the incoming trunks ICT and a relatively small number of secondary crossbar switches SEC, SWS, SECL coupled with the primary crossbar switches PRI, SWS by a plurality of links 4 and connected with the incoming registers IR by other circuitry. For example, an incoming register link IRL comprises ten incoming register link frames, each having five primary crossbar switches PRI SWS No. 0, . . . No. 4 and four secondary crossbar switches SEC SWS No. 1 . . ., and No. 3; each primary crossbar switch PRI SW (0, 1, 2, 3, or 4) is connected with sixteen incoming trunks ICT and includes four links coupled with the four secondary crossbar switches SWS No. 1–No. 3 in the same frame, respectively; and the corresponding secondary crossbar switches SEC SWS (0, 1, 2, or 3) in each of the incoming register link frames is connected with sixteen incoming registers IR. Thus, in the example being described, eight hundred incoming trunks ICT are arranged in fifty groups, each of which is coupled, through a primary crossbar switch PRI SW in an incoming register link frame and the secondary crossbar switches SEC SWS in the same frame, with sixty-four incoming registers IR. An incoming register link controller (not shown, usually abbreviated to IRLC) provided for each incoming register link frame operably connects one of the incoming registers IR with that one of the incoming trunks ICT through which a call is to be routed from a preceding office to the called subscriber's stations SUB.

In case the preceding office is provided with step-by-step equipment, dial-pulse incoming registers (generally shortened to DPIR but not shown) are used as the incoming registers IR. In such a switching network, an incoming register IR should have been connected with an incoming trunk ICT within duration of the dial pause of the calling party being accommodated by the preceding office. When the calling party has dialed before the connection has been completed, the incoming register IR cannot correctly count and register the dial pulses. This results in a misconnection or a disabled connection. It is therefore the practice to send back to the incoming trunk ICT a signal showing the seizure of an incoming register IR and to send back to the calling party, in case the dial pulses have reached the incoming trunk ICT before the seizure signal is sent back thereto, the busy tone.

The cases where the busy tone is sent back to the calling party on connecting the incoming trunk ICT with the incoming register IR are, according to the theory of traffic, as follows:

(1) The case where the incoming register link controller, when energized, may at once have selected an incoming register IR and initiated the connection operation but cannot complete it, on account of the relation between the dial pause of the calling party and the stepping of the selector in the preceding step-by-step office, the connection within the remainder of the dial pause;

(2) The case where the incoming register link controller cannot connect the incoming trunk ICT with any one of the incoming registers IR because all the outgoing links of that one of the primary crossbar switches PRI SWS with which the incoming trunk ICT is connected are busy;

(3) The case where the incoming register link controller cannot connect the incoming trunk ICT, although the primary crossbar switch PRI SW has some idle outgoing links, with the incoming register IR because of mismatching between these idle outgoing links and the idle incoming registers IR (because of the link mismatch);

(4) The case where the incoming register link controller cannot operate to complete the connection because it is busy; and (5) The case where the incoming register link controller cannot effect the connection because all the incoming registers IR are busy.

Among the cases (1) to (5) just mentioned, the cases (1) and (4) have no direct concern with the multiple link connection. It is therefore sufficient, on considering the loss of calls particular to the multiple link connection, to take the cases (2), (3), and (5) into account. For simplicity, the central office equipment is now deemed not to be of the "wait-if-busy" type, but to be of the "direct-connection" type wherein a call given through an incoming trunk ICT is at once counted as a loss if one of the cases (2), (3), and (5) occurs on connecting the incoming trunk ICT with an incoming register IR. It is to be understood here that a call is not lost if these cases have disappeared and the connection has been completed within the dial pause of the call.

The probability of loss, as calculated for simulated traffic by an electronic computer in conjunction with the incoming register link IRL of the example given above, is as follows:

Given conditions:

the average holding time of the incoming trunk ICT is 100 sec., the holding time of the dial-pulse incoming register IR is 9 sec., the actual service of the dial-pulse incoming register IR is about 70 percent, and the actual service of the incoming trunk ICT is about 63 percent.

The probability of loss:

| | |
|---|---|
| Caused by case (2)—the outgoing links of the primary lattice PRIL are all busy | $7.3\times10^{-3}$ |
| Caused by case (3)—the link mismatch is present | $3.7\times10^{-3}$ |
| Caused by case (5)—the dial-pulse incoming registers IR are all busy | $1.1\times10^{-3}$ |
| Total | $12.1\times10^{-3}$ |

Inasmuch as the loss of calls arising from the fact that the outgoing links of a primary crossbar switch PRI SW connected with the selected incoming trunk ICT are busy is considerably probable, it is desirable to prevent the selection of an incoming trunk ICT coupled with a primary crossbar switch PRI SW whose outgoing links are all busy.

Figure 3:
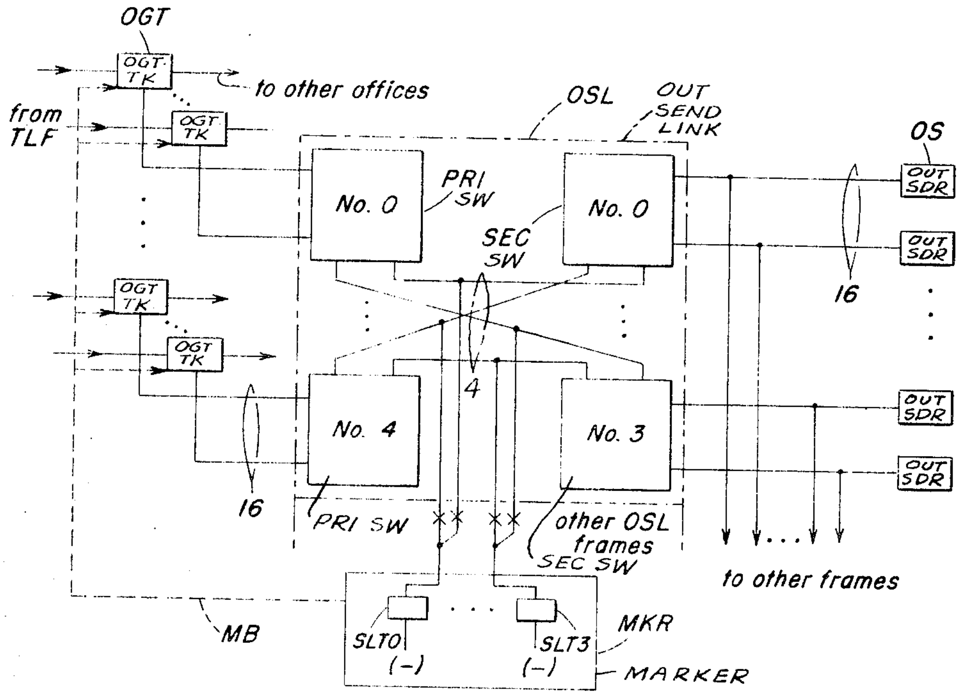
FIG. 3 is a block diagram showing an outgoing sender link of the telephone central office of FIG. 1, together the outgoing trunks, the outgoing senders, and a portion of the marker.

Turning now to FIG. 3, the outgoing sender link OSL is also of the double link connection type and comprises a relatively large number of primary crossbar switches PRI SWS connected with the outgoing trunks OGT and a relatively small number of secondary crossbar switches SEC SWS coupled with the primary lattices PRIL by a plurality of links and connected with the outgoing senders OS. For example, an outgoing sender link OSL comprises ten outgoing sender link frames, each having five primary crossbar switches PRI SWS No. 0, . . . , No. 4 and four secondary crossbar switches SEC SWS No. 0, . . . , No. 3; each primary crossbar switches PRI SW is connected with sixteen outgoing trunks OGT and includes four links coupled with four secondary crossbar switches SEC SWS in the same outgoing sender link frame, respectively; and the corresponding secondary crossbar switch SEC SW in each of the outgoing sender link frames is connected with sixteen outgoing senders OS. Thus, in the example being explained, eight hundred outgoing trunks OGT are arranged in fifty groups, each of which is coupled, through a primary crossbar switch PRI SW in an outgoing sender link frame and the secondary crossbar switches SEC SWS in the same frame, with sixty-four outgoing senders OS.

On selecting, by the aid of the translator (not shown, generally abbreviated to TLR), one of the outgoing trunks OGT through which the desired connection is to be made from the trunk link frame TLF to the called party, the marker MKR provided in common for the outgoing sender link frames determines the route, tests the idle-outgoing-trunk-test leads leading from the outgoing trunks OGT belonging to the route to determine which of such outgoing trunks OGT are idle and which are busy, and then seizes one of the idle outgoing trunks OGT. Likewise, the marker MKR selects a group of outgoing senders OS and, on determining one of idle outgoing senders OS accommodated by the selected group, tests by means of the idle-outgoing-sender-link-test relays SLT0, . . . , and SLT3 which of the outgoing links of the primary crossbar switch PRI SW connected with the seized outgoing trunk OGT are usable. This test by the relays SLT10, . . . , and SLT3 is carried out by sensing ground potential which is present on those *c* wires (not shown) of the outgoing sender link OSL which have already been seized by the busy outgoing senders OS. If all the outgoing links of the selected primary crossbar switch PRI SW have already been busy or seized by the outgoing senders OS, all the relays SLT0, . . . , and SLT3 are energized to disable these outgoing links from being connected with any further outgoing senders OS. The marker MKR therefore is held waiting until one of these outgoing links is set free. This means a break in the sequence of the marker operation and results in continuance of the held state within a predetermined time interval. Inasmuch as this causes a serious increase in the holding time of the marker MKR, it is desirable to prevent the call from reaching the outgoing trunk OGT which is connected with the primary crossbar switch PRI SW whose outgoing links are busy. Furthermore, the holding of the marker MKR beyond the predetermined time interval results in the sending back to the calling party of the busy tone as is well known to those skilled in the art.

Figure 4:
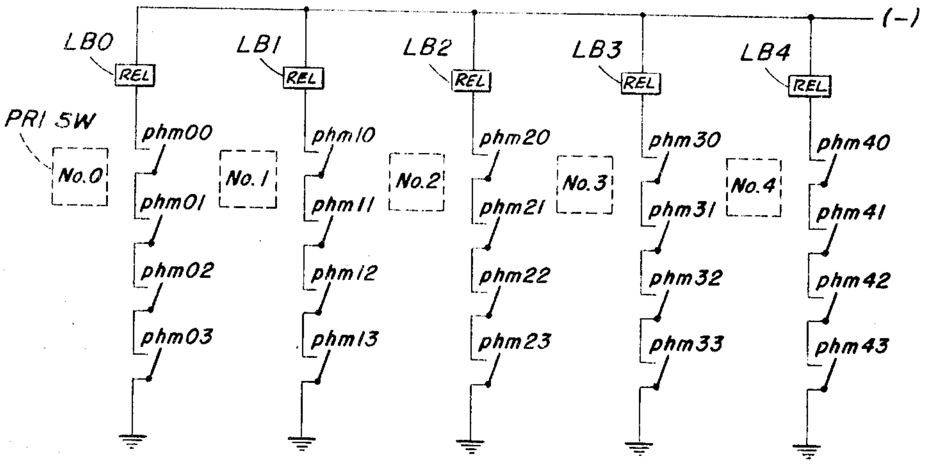
FIG. 4 is a partial circuit diagram of a specific embodiment provided according to this invention for use with the incoming register and of an outgoing sender link frames shown in FIGS. 2 and 3, respectively.

Referring now to FIG. 4, the crossbar switches (not shown) of a No. 0 primary lattice PRIL-No. 0 of an incoming register or an outgoing sender link frame are provided with off-normal contacts *phm*00, . . . , and *phm*03 which are closed when the respective vertical magnets (not shown) are in operation and consequently when the corresponding links of the respective primary crossbar switches PRI SWS are busy. It should be understood here that the vertical paths of the primary crossbar switches PRI SWS No. 0 . . . No. 4 provide the outgoing links thereof. These contacts *phm*00, . . . , and *phm*03, if closed, energize a No. 0 all-busy relay LB0. The relay LB0, when energized, closes its all-busy contacts $lb0^0$, . . . , and $lb0^{15}$ (FIG. 5B or 6) which are placed in the leads coupling this primary crossbar switch PRI SW No. 0 with the associated sixteen incoming trunks ICT or outgoing trunks OGT, respectively, and send all-busy signals to the respective trunks ICT or OGT. Similarly, each of the crossbar switches of the No. 1, . . . , and No. 4 primary crossbar switches PRI SWS VS provided with four off-normal contacts *phm*10, . . . , *phm*43 and four all-busy relays LB1, . . . , LB4, respectively. The respective relays LB1 through LB4, when energized, close the all-busy contacts $lb1^0$, . . , and $lb1^{15}$; $lb2^0$, . . . , and $lb2^{15}$; $lb3^0$, . . . , and $lb3^{15}$; $lb4^0$, . . . , and $lb4^{15}$ (not shown) associated therewith.

Referring to FIG. 5B, the all-busy contact $lb0^0$ among the all-busy contacts $lb0^0$, . . . , and $lb0^{15}$ is connected with a terminal LBY of No. 0 incoming trunk ICT-No. 0 among the sixteen incoming trunks ICT coupled with the No. 0 primary crossbar switch PRI SW No. 0 in FIG. 5B. The terminal LBY is connected with the lead connecting the *a* wire of the incoming trunk ICT No. 0 with the *c* wire at a point between the contacts $a^0$ and $co^1$. Closure of the all-busy contacts $lb0^0$, . . . , and $lb0^{15}$ in FIG. 5B therefore energizes the D relay through the path comprising the negative power source (—) for this relay, the winding of this relay, the *a* wire, the contact $c^0$, the resistor, the contact $a^0$, the terminal LBY, the now closed all-busy contact $lb0^0$, and ground potential. Energization of the D relay closes its contact $d^0$ so as to ground the *b* wire. Ground potential on the *b* wire is effective through the interoffice trunk INTT to that signal repeater REP-No. 0 of the preceding step-by-step office, FIG. 5A, which is connected with the incoming trunk ICT-No. 0, FIG. 5B.

Thus, the E relay in the repeater REP-No. 0 is energized through the path comprising the negative power source (—) the operating winding of the latter relay, and the *b* wire on which the ground potential is now present. Now, E relay opens its contact $e^0$, disposed between the *c* wire of the repeater REP-No. 0 and the negative power source (—) for the C relay, to remove the negative voltage from the *c* wire. It is to be noted here that the winding of this C relay is divided into two portions one of which has shunting contacts $e^0$ and $k^0$ and the other a shunting contact $c^3$ and that other relays are similarly illustrated by two small rectangles showing the respective relay winding portions. The origin of a call at a subscriber's station being accommodated by a step-by-step central office closes the contact *c* in an idle selector SEL seized by the call and initiates a stepping of the wipers $W_a$, $W_b$ and $W_c$ along the *a*, *b*, and *c* banks. Stepping along the *c* bank, the wiper $W_c$ successively grounds, through the now closed contact *c*, the two windings of the P relay (the contact *w* is open when the wipers stop and is closed as they move), and the *c* wire of the selector SEL, the *c* wires of the repeaters REP connected with this selector SEL (one of the winding portions of the P relay is shorted by the contact $p^8$ during energization of the P relay). In case the contact $e^0$ is left closed in one of such repeaters REP, grounding of the *c* wire of a particular repeater REP puts the latter repeater into operation as is known in the art. Contrary to this, ground potential which is now present on the *c* wire of the repeater REP-No. 0 has no effect on the C relay of repeater REP-No. 0 for the reason just mentioned. Thus, all incoming trunks ICT and all signal repeaters REP that are connected with that primary crossbar switch PRI SW-No. 0 of the incoming register link IRL whose outgoing links are all busy are blocked by the operation of relay LB0 which closes its all-busy contacts $lb0^0$, . . . , $lb0^{15}$. In a similar manner, all incoming trunks ICT and all signal repeaters REP connected with primary crossbar switch PRI SW Nos. 1 through 4 of incoming link IRL whose outgoing links are all busy at the moment are blocked by the operation of relays LB1 through LB4, respectively.

Referring further to FIG. 5B, it will now be assumed that the primary crossbar switch No. 0 of the incoming register link IRL has at least one idle outgoing link. In this case, the all-busy relay LB0 is not operated. This means that the electric connections extended from *a* wire of the incoming trunks ICT coupled with this primary crossbar switch PRI SW No. 0 ground through the terminals LBY and the all-busy contacts $lb0^0$, . . . , and $lb0^{15}$ have no concern with the operation of the latter incoming trunks ICT. When the incoming trunk ICT-No. 0 has already been in service under the latter circumstances, the C relay and hence the E relay of the signal repeater REP-No. 0 coupled therewith in FIG. 5A are in their respective energized states in the manner known in the art. This blocks the operation of the repeater REP-No. 0 in the manner above described. If the No. 0 incoming trunk ICT-No. 0 is idle, the associated repeater REP-No. 0 is also idle. In this case, ground potential supplied from the selector SEL via wiper $W_c$ to the *c* wire of the repeater REP-No. 0 energizes the C relay therein by way of that one portion of its winding connected with the negative power source (—) (the other portion of the C relay winding being shunted by the relay contact $c^3$ serves to control the timing of the operation). This activates the E relay into operation by closure of the contact $c^4$ of the C relay and then the K relay into operation (change over of the contacts $c^3$ and $e^0$ connects the winding of the K relay with the negative power source via one portion of the operating winding of the C relay). Thus, the E relay is disconnected from the *b* wire, which now serves together with the *a* wire for telephone communication (the contacts $c^0$ and $c^1$ in the *a* and *b* wires, respectively, have already been closed; and the wipers of the selector are held connected with the repeater REP-No. 0). In the meanwhile, the operating winding of A relay (not shown) of the incoming trunk ICT-No. 0 is energized simultaneously with the energization of the operating winding of the E relay in the associated repeater REP-No. 0 and thereafter is de-energized as soon as the operating winding of the K relay is energized in the repeater REP-No. 0. The A relay, when operated, energizes in turn the C relay (not shown) of the incoming trunk ICT-No. 0 and one of the TG relays (not shown) in the incoming register link IRL. The energized TG relay eventually energizes one of the RP relays (not shown) in the incoming register link IRL. The energized RP relay now energizes the C0 relay (not (shown) of the incoming trunk ICT-No. 0. The *a* wire of the incoming trunk ICT-No. 0 is now connected with the primary crossbar switch PRI SW No. 0. It is to be noted here that both *a* and *b* wires are connected with the latter primary switch in case the preceding office is provided not with a step-by-step switchboard but with a crossbar switchboard. Also, other components, such as the ring trip relay F, are shown in FIG. 5B only for the purpose of providing a better understanding of the invention by those skilled in the art and are not mentioned in detail elsewhere herein because such components have no direct concern with the concept of the instant invention. Accordingly, it is now appreciated that the all-busy signals sent out from one of the primary crossbar switches PRI SWS of the incoming register link IRL in FIGS. 2 and 5B block all the incoming trunks ICT and the signal repeaters REP (in a step-by-step switchboard in FIG. 5A) connected thereto or the outgoing trunks (in a common-control central office) connected with the latter one primary crossbar switches PRI SWS and that the latter signals make a call detour around the blocked incoming trunks ICT to reach another one of the incoming trunks ICT connected with another one of the primary crossbar switches PRI SWS that has at least one idle link in the four thereof connected to the secondary crossbar switches SEC SWS.

This invention when applied to the primary crossbar switches PRI SWS of the incoming register link IRL and the incoming trunks ICT, prevents a call from reaching that one of the primary crossbar switches PRI SWS whose outgoing links are all busy and thus substantially reduces the probability of loss of calls. The probability calculated by an electronic computer in conjunction with the incoming register link IRL of the above-mentioned example in which this invention is embodied, is as follows:

The probability of detours of calls due to the event that all the outgoing links of a primary lattice PRIL are busy is $7.5\times10^{-3}$; the probability of the link mismatch is $3.9\times10^{-3}$; and the probability of the event that all the dial-pulse incoming registers IR are busy is $0.9\times10^{-3}$. Inasmuch as the first one is not the actual loss of calls, the probability of loss in total is $4.8\times10^{-3}$ and is more than twice as little as the total probability of loss of $12.1\times10^{-3}$ that is attainable with conventional incoming register link IRL. In this connection, it should be noted that detour of calls little affects the probability of the link mismatch and that of the event that the dial-pulse incoming registers IR are all busy.

Referring to FIG. 6, the all-busy contact $lb0^0$ among the sixteen all-busy contacts $lb0^0$, . . . , and $lb0^{15}$ operable by a primary crossbar switch PRI SW No. 0 is put between terminals MBG and G of outgoing trunk OGT-No. 0 among the sixteen outgoing trunks OGT coupled with the latter primary switch PRI. The terminals MBG and G are interposed in the circuit for controlling energization of the M relay of the outgoing trunk OGT-No. 0. Closure of the all-busy contacts $lb0^0$, . . . , and $lb0^{15}$ due to therefore energizes the M relay through the path comprising the negative power source (—), the two winding portions of the M relay, the contact $c_1^4$, the terminal MBG, the now closed all-busy contact $lb0^0$, the terminal G, the contact $b^0$, and ground. Operation of the M relay opens its contact $m^1$ disposed in the group busy lead GB so as to remove ground therefrom and thereby to inform the associated marker MKR that the group of outgoing trunks OGT connected with the primary crosbar switch PRI SW No. 0 are not to be used. At the same time, operation of the M relay closes its contact $m^2$ so as to energize the $C_1$ relay through the path including the negative power source (−), the winding of the latter relay, the now closed contact $m^2$, and ground. Operation of the $C_1$ relay in turn opens its contact $c_1{}^3$ disposed in the idle-outgoing-trunk-test lead MB of the latter outgoing trunk OGT-No. 0 leading to the marker MKR so as to notify the latter that the particular outgoing trunk OGT-No. 0 is not to be used. Similarly, the corresponding contacts $c_1{}^3$ in the respective remaining outgoing trunks OGT coupled with the crossbar switch PRI SW No. 0 are opened to interrupt the corresponding idle-outgoing-trunk-test leads MB whereby the latter outgoing trunks OGT are also blocked.

Referring further to FIG 6, it is now presumed that the primary crossbar switch PRI SW No. 0 has at least one idle outgoing link. In this case, the contacts $c_1{}^3$, $e_1{}^2$, and $a^2$ are operated independently of the all-busy contacts $lb0^0$, . . . , and $lb0^{15}$. (The contact $a^2$ is opened as soon as the idle outgoing trunk is seized, through energization of the A relay by its third winding (not shown); the contact $c_1{}^3$ is opened at first when the $C_1$ relay is energized through the outgoing sender link OSL to send the dial pulses from the outgoing sender OS to the other office and afterwards when the $C_1$ relay is again operated after the operation of the $E_1$ relay; the contact $e_1{}^2$ is opened by the operation of the $E_1$ relay when ground is supplied thereto by the responding called party to the *a* wire of the outgoing trunk; these contacts $a^2$, ${}^c{}_1{}^3$, and $e_1{}^2$ successively return to their respective unoperated positions after the calling party returns to the on-hook state.) The marker MKR, having found by way of the idle-outgoing-trunk-test lead MB that the outgoing trunk OGT-No. 0 is idle, tests the links of the primary crossbar switch PRI SW No. 0 by means of the idle-outgoing-sender-link-test relays SLTO, . . . , and STL3 in FIG. 3. Inasmuch as the primary crossbar switch PRI SW No. 0 has at least one idle connected to the secondary crossbar switches SEC SWS Nos. 0 . . . 3 link, it is not necessary for the marker MKR to wait until one of such links becomes idle and it never happens that the busy tone is sent back to the calling party after the marker MKR has waited longer than the aforementioned predetermined time interval for an idle link.

It will not be appreciated that this invention, when applied to the primary crossbar switches PRI SWS of the outgoing sender link OSL and the outgoing trunks OGT in FIG. 6, causes the all-busy signals produced by closure of the all-busy contacts $lb0^0$, . . . , and $lb0^{15}$ of the respective all-busy relays LB0 . . . LB4 in FIG. 4 to block all the outgoing trunks connected with those latter primary switches PRI SWS whose links are all busy. This warrants selection by the marker MKR of one of the outgoing trunks OGT coupled with that one of the primary crossbar switches PRI SWS which has at least one idle outgoing link. Thus, this invention eliminates lengthening of the holding time of the marker MKR and consequent loss of calls.

While some embodiments of this invention have so far been described with reference to the accompanying drawings, it should be undertood that the all-busy relay LB0, . . . , and LB4 may either be substituted for by diodes or other electronic switches or, in some cases, even dispensed with. Also, it is to be noted that the off-normal contacts *phm*0, . . . , and *phm*3 allotted to the outgoing links of each of the primary lattices PRI form an at-least-two-state member or switching members and that the all-busy contacts $lb0^0$, . . . , and $lb0^{15}$; $lb1^0$, . . . , and $lb1^{15}$; $lb2^0$, . . . , and $lb2^{15}$; $lb3^0$, . . . , and $lb3^{15}$; $lb4^0$, . . . , and $lb4^{15}$ assigned to the incoming trunks ICT or the outgoing trunks OGT connected with each of the primary crossbar switches PRI SWS in FIGS. 4, 5A, 5B and 6 form an at-least-two-state element or switching elements. What should furthermore be noted is that the off-normal contacts *phm*00, . . . , and *phm*43 may not be specifically provided for the primary crossbar switches PRI SWS of each incoming register or outgoing sender link frame but may be the conventional ones that are closed by the vertical magnets.

It is understood that the invention herein is described in specific respects for the purpose of this description. It is also understood that such respects are merely illustrative of the application of the principles of the invention. Numerous other arangements may be devised by those skilled in the art without departing from the spirit and scope of the invention.

What is claimed is:

1. A telephone system comprising, in combination:

a plurality of groups of signaling trunks;

a plurality of groups of signaling devices;

a plurality of automatic primary switches, each connected to one of said trunk groups;

a plurality of automatic secondary switches, each connected to one of said device groups;

a plurality of groups of conductive links, each link group connecting one of said primary switches with each of said secondary switches;

and a plurality of circuit means, each included in one of said primary switches; said circuit means in a predetermined one of said primary switches activated to apply ground busy signals to the trunk group connected to said last-mentioned one primary switch when all of said links in the link group connected to said last-mentioned one primary switch are busy in response to calls for blocking said last-mentioned trunk group and one primary switch from receiving further calls.

2. The telephone system according to claim 1 in which said plurality of circuit means comprises a plurality of groups of conductive members, each member group included in said circuit means in one primary switch and operatively associated with the link group connecting one primary switch with each secondary switch, each member group associated with one link in each link group; each of said members operable to one of open and closed states at a given time; each of said members operated to said open state when the link associated therewith is idle and to said closed state when the link associated therewith is busy; said members of said member group included in said circuit means in said predetermined one primary switch and associated with said busy link group connected to said last-mentioned switch being operated to said closed state to activate said last-mentioned circuit means to apply said ground busy signals to said trunk group connected to said last-mentioned switch.

3. The telephone system according to claim 2 in which all of said members in said member group associated with said busy link group connected to said predetermined one primary switch are operated to said closed state to form a series electric energy circuit to activate said circuit means included in said last-mentioned switch.

4. The telephone system according to claim 3 in which said plurality of circuit means includes a plurality of groups of conductive elements, each element group included in said circuit means in one primary switch and connected to the trunk group connected to the latter switch in such manner that each element is connectable to one trunk; each element having one end connected to ground and an opposite end operable to one of open and closed states at a given time; said elements in each group thereof in each latter switch operated to said open state to withhold ground from said trunks connectable therewith when at least one member in the member group in the same latter switch is operated to said open state and said elements in each group thereof in the latter switch operated to said closed state to apply ground to said trunks connected therewith when all of said members in the member group in the same latter switch are operated to said closed state; said elements in said element group in said predetermined one primary switch operated to said closed state to apply ground busy signals to the respective trunks in the trunk group connected to said last-mentioned switch when all of said members in said member group in said last-mentioned switch are operated to said closed state to form said series energy circuit.

5. The telephone system according to claim 1 in which said plurality of circuit means includes:

a plurality of groups of conductive members, each member group included in said circuit means in one primary switch and operatively associated with the link group connecting said last-mentioned switch to each secondary switch; each member associated with one link in each link group and operable to an open state when the link associated therewith is idle and to a closed state when the link associated therewith is busy; said members of said member group included in said circuit means in said predetermined one primary switch and associated with said busy link group connected to said last-mentioned switch being operated to said closed state to form a series electric energy circuit;

and a plurality of groups of conductive elements, each element group included in said circuit means in one primary switch and connectable to the trunk group connected to said last-mentioned switch in such manner that each element is connectable to one trunk; each element having one end connected to ground and an opposite end operable to one of open and closed states at a given time; said elements in each group thereof operated to said open state to withhold ground from said trunks connectable therewith when at least one member in the member group in the same primary switch with said last-mentioned elements is operated to said open state to interrupt said series energy circuit and said elements in each group thereof operated to said closed state to apply ground to said trunks connectable therewith when all of said members in the member group in the same primary switch with said last-mentioned elements are operated to said closed state to form said series circuit; said elements in said predetermined one primary switch operated to said closed state in response to said series energy circuit to apply ground busy signals to the respective trunks in said trunk group connected to said last-mentioned switch when all of said members in said member group in said last-mentioned switch are operated to said closed state to form said last-mentioned circuit.

6. The telephone system according to claim 5 in which said plurality of circuit means includes a plurality of further circuit means, each connected to one of said trunks for receiving therefrom said ground busy signals applied thereto; said further circuit means connected to said trunks connected to said predetermined one primary switch being activated by said ground busy signals applied to said last-mentioned trunks to block said last-mentioned trunks from receiving a further call and at the same time to route said last-mentioned call to an idle trunk connected to another primary switch having one idle link.

7. A telephone system comprising, in combination:

a plurality of groups of signaling trunks;

a plurality of groups of signaling devices;

a plurality of automatic primary switches, each connected to one of said trunk groups;

a plurality of automatic secondary switches, each connected to one of said device groups;

a plurality of groups of conductive links, each connecting one of said primary switches to each of said secondary switches;

and means to block a call on a trunk group connected to a primary switch having all busy links in a link group connected therewith in response to other calls and at the same time to route said call to an idle trunk connected to another primary switch having one idle link in the link group connected thereto, including:

a plurality of groups of conductive members, each member group included in one primary switch and operatively associated with the link group connecting said last-mentioned switch to each secondary switch, each member associated with one link in each link group and operable to an open state when said last-mentioned link is idle and to a closed state when said last-mentioned link is busy; said members in a member group in a predetermined primary switch having all busy links in the link group connected thereto being closed to form an electric energy circuit;

a plurality of groups of conductive elements, each element group included in one primary switch and connectable to the trunk group connected to said last-mentioned switch in such manner that each element is connectable to one trunk; each element having one end connected to ground and an opposite end operable to one of open and closed states at a given time, said elements in each group thereof operated to said open state to withhold ground from said trunks connectable therewith when at least one member in the member group in the same primary switch with said last-mentioned elements is operated to said open state to interrupt said energy circuit and said elements in each group thereof operated to said closed state to apply ground to said trunks connectable therewith when all of said members in the member group in the same primary switch with said last-mentioned elements are operated to said closed state to form said energy circuit; said elements in said predetermined primary switch operated to said closed state in response to said energy circuit to apply said ground busy signals to the respective trunks in the trunk group connected to said last-mentioned switch when all of said members in the member group in said last-mentioned switch are operated to said closed state to form said last-mentioned circuit;

and a plurality of circuit means, each connected to one of said trunks to receive therefrom said ground busy signals applied thereto; said circuit means connected to said trunks which are connected to said predetermined primary switch being activated by said ground busy signals received from said last-mentioned trunks to block said last-mentioned trunks from receiving a further call and at the same time to route said last-mentioned call to an idle trunk connected to another primary switch having an idle link.

References Cited

UNITED STATES PATENTS 2,201,986 5/1940 Collis.
2,787,661 4/1957 Buchner.
2,895,012 7/1959 Liston et al.

WILLIAM C. COOPER, Primary Examiner